Feb. 4, 1969         W. C. CONKLING ET AL         3,425,279
                VARIABLE RESTRICTION FLUID FLOWMETER
Filed March 20, 1967
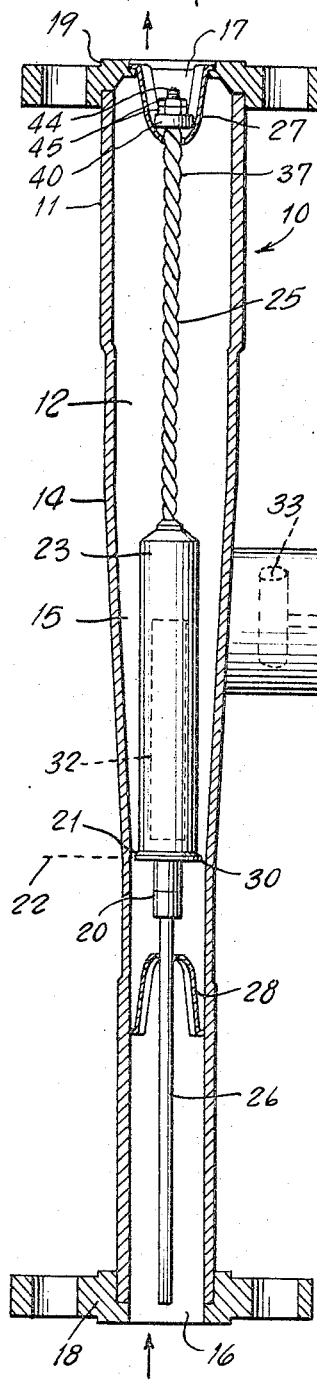
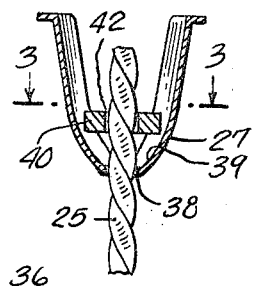
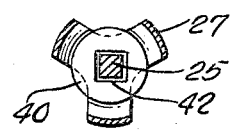
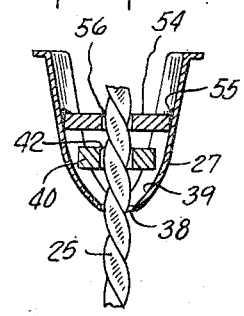
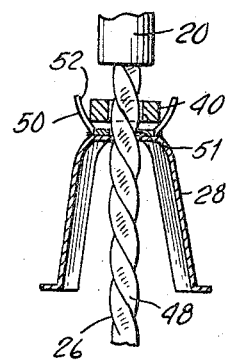
INVENTORS
WILLIAM C. CONKLING
CHARLES W. MOSHER
BY
Lester N. Clark
ATTORNEY

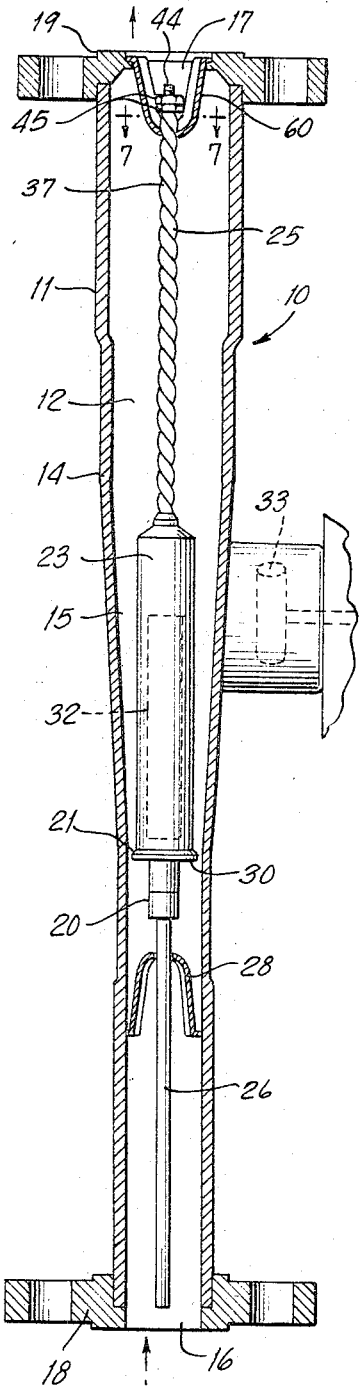
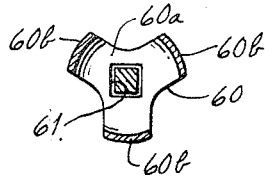
Fig. 6.
Fig. 7.
Fig. 8.
INVENTORS
WILLIAM C. CONKLING
BY CHARLES W. MOSHER
Robert S. Dunham
ATTORNEY

United States Patent Office 3,425,279
Patented Feb. 4, 1969

3,425,279
VARIABLE RESTRICTION FLUID FLOWMETER
William Collins Conkling, Essex Fells, and Charles William Mosher, West Caldwell, N.J., assignors to Wallace & Tiernan Inc., Belleville, N.J., a corporation of Delaware
Continuation-in-part of application Ser. No. 540,878, Apr. 7, 1966. This application Mar. 20, 1967, Ser. No. 624,316
U.S. Cl. 73—209    21 Claims
Int. Cl. G01f 1/00

ABSTRACT OF THE DISCLOSURE

A device for damping vertical float oscillation in a variable restriction fluid flowmeter, including a stem having a helical thread and extending vertically from the float along the fluid passage of the meter, and an apertured member loosely threaded on the stem so that the stem is movable vertically relative to the apertured member only by rotation relative to the apertured member. The apertured member is held in the fluid passage against rotation and vertical displacement at least while the float and stem are moving downwardly; hence downward float movement is necessarily accompanied by rotary threading motion of the stem through the apertured member (and concomitant rotation of the float), which retards the rate of float descent.

Cross references to related applications

This application is a continuation-in-part of the copending application of William C. Conkling and Charles W. Mosher, Ser. No. 540,878, filed Apr. 7, 1966, for Variable Restriction Fluid Flow Meter now abandoned.

Background of the invention

This invention relates to devices for measuring the flow rate of fluids, and more particularly to so-called variable restriction fluid flowmeters having floats stabilized against vertical oscillation.

In a flowmeter of the variable restriction type as herein contemplated, the fluid to be metered flows upwardly through a vertically oriented tube having disposed therein a vertically movable float which rides in the stream of fluid. The tube and float cooperate to define an annular space, for passage of fluid between them, that varies in cross-sectional area depending on the vertical position of the float. For example, one form of such meter has an elongated downwardly-tapering float and a shorter cylindrical tube; an alternative form has an enlongated downwardly-tapering tube and a shorter float. In both forms, as will be understood, the area of the annular space for fluid flow increases as the float moves upwardly. While a complete analysis of the upward and downward forces acting on the float is complex, it is well known that in the operation of this type of meter, the float assumes a unique and constant vertical position for any given constant rate of flow of a given fluid passing through the meter, within the range of flow rates measurable by the meter; thus the float position provides an indication of the flow rate, and is real as such by means of a suitable indicating mechanism.

A problem heretofore encountered in some instances of operation of these meters is that the float may tend to undergo vertical oscillation, which is undesirable since it makes the meter difficult to read and may result in inaccurate measurement. Although vertical oscillation of the float may occur in any variable restriction meter, it is especially common in meters having floats of relatively high mass. A meter configuration with a float of comparatively high mass is inherently less stable than a meter configuration with a float of comparatively low mass and with other compensating physical dimensions to result in an equivalent flow. The properties of the fluid being measured are also significant in this regard, it having been found that vertical float oscillation occurs most frequently in the case of relatively high-mass floats operating with compressible fluids of low density.

It is often possible to avoid the problem of float oscillation by providing a meter configuration utilizing a float of low mass to insure stability. However, such a meter requires a large metering restriction than a meter of equivalent flow capacity with a float of higher mass, and therefore presents the disadvantages of increased physical size and manufacturing cost.

Again, it may be convenient or desirable to employ a type of indicating mechanism that contributes substantial mass to the float. Thus, metal-enclosed meters of both the tapered float type and the tapered-tube type commonly utilize a magnetically actuated indicator for registering float position, including an actuating magnet enclosed within or supported by the meter float. For reasons of manufacturing convenience and economy, it is common practice to use the same standard size of indicator means for a variety of different sizes of meter; in the smaller meter sizes the actuating magnet represents a disproportionate share of the total float mass, resulting in tendencies toward float oscillation.

In meter designs with vertical fluid entry and exit (providing a continuous, straight vertical path for fluid flow through the meter, as necessary or convenient for various metering applications), the actuating magnet is usually enclosed within the float and must magnetically couple across the moving fluid stream to the indicator means. Therefore, increasingly stronger magnets are needed to overcome the increased dimensions of meters of greater flow capacity. Satisfactory magnetic coupling frequently requires magnets of such size that excessive float mass and pronounced oscillating tendencies result over a range of meter sizes. Accordingly, it is ordinarily necessary to limit the use of such meters to operation with incompressible fluids or compressible fluids of high density.

In prior practice, float stabilizing devices such as viscous dashpots or variations thereof have been used with both tapered tube meters and tapered float meters to prevent float oscillation. However, these devices have required an enclosed chamber isolated from the fluid flow and extending either above or below the meter float. Therefore, such devices are not readily adaptable to "straight-through" flow meter configurations with vertical fluid entry and exit. Furthermore, devices using a viscous damping liquid require compatibility of the damping liquid with the fluid being metered; and replacement of the damping liquid is periodically necessary due to evaporation, entrainment in the fluid stream or contamination.

Summary of the invention

An object of the present invention is to provide a variable restriction fluid flowmeter including new and improved means for stabilizing the meter float against vertical oscillation.

Another object is to provide such a meter, having utility for metering of low-density compressible fluids, and wherein the float may be of comparatively high mass, with superior freedom from vertical float oscillation.

A further object is to provide such a meter wherein effective prevention of vertical float oscillation is afforded without use of dashpots or damping liquid.

Still another object is to provide such a meter including means for preventing vertical float oscillation that may be conveniently and effectively employed in vertical fluid entry and exit configurations.

To these and other ends, the invention broadly contemplates the combination with a meter tube and float, in a variable restriction flowmeter of either the tapered-tube or tapered-float type, of a helically threaded stem extending vertically from one end of the float for movement therewith along a vertical path; an apertured member loosely threaded on the stem; and means for holding the apertured member to prevent rotation and vertical displacement thereof relative to the meter tube at least during vertical displacement of the float and stem in one direction. The stem and apertured member are mutually dimensioned and adapted to permit vertical displacement of the stem relative to the apertured member but to require rotation of the stem relative to the apertured member incident to such relative vertical displacement, so that movement of the float and stem in the aforementioned one direction while the apertured member is held necessitates rotary threading motion of the stem through the apertured member and concomitant float rotation, thereby retarding the vertical displacement of the float in such direction.

In one embodiment, the means for holding the apertured member is a fixed stop member disposed in the path of the stem but permitting vertical movement of the stem past the stop member, and the apertured member itself is a movable collar disposed on the stem above the stop member. The aperture of the collar, through which the stem extends, is so dimensioned that the collar loosely engages the threaded stem surface. Further, the aperture edge and the stem thread are mutually shaped and adapted to permit relative vertical displacement of the collar and stem, when there is a net difference in the vertical forces acting on them, but to require relative rotation of the collar and stem for such vertical displacement. The collar and stop member are so arranged that downward displacement of the collar is arrested by engagement with the stop member.

In other words, the collar is loosely threaded on the stem, and is limited in downward travel by the stop member interposed in the stem path. Thus, when the float is stationary, the collar rests on the stop member. Upon upward movement of the float, the collar tends to be carried upwardly by the stem, away from the stop member; but the downward force of gravity on the collar causes it to fall back down onto the stop member, rotating around the stem as it falls, the dimensions and shape of the thread and collar permitting such downward movement and rotation of the collar to occur substantially freely. On the other hand, when the float moves downwardly, the loosely threaded engagement of the stem with the collar pulls the collar down and causes the collar to bear against the stop member. Friction between the collar and stop member then restrains rotation of the collar, and hence the downward forces acting on the float cause the float to rotate as required for downward movement relative to the arrested collar.

As a result, oscillating tendencies of the float are opposed, because energy is absorbed each time the collar seats against the stop member, and because the effective mass of the float is greater during downward movement (when float rotation occurs) than during upward movement. This difference in effective mass aids in upsetting the natural frequency of float oscillation. Frictional forces during downward float motion also contribute some damping action.

In another embodiment, the apertured member is formed integrally with or rigidly secured to the fixed stop member—for example, constituting a central apertured portion of the stop member itself—so as to be held against rotation and vertical displacement relative to the meter tube during vertical movement of the float and stem in either upward or downward direction. The relative dimensions of the stem and the aperture of the stop member in this embodiment correspond to the relative dimensions of the stem and the collar aperture in the embodiment described above; and since the apertured member is held against movement in either direction, upward as well as downward displacement of the float necessitates rotary threading motion of the stem through the apertured member. Upward movement of the float is therefore accompanied by float rotation in one direction, while downward float movement is accompanied by rotation in an opposite direction. This arrangement affords frictional damping of float movement, together with increase in effective float mass (as compared to the mass of the float under static conditions) during both upward and downward float travel and thereby, again, serves to stabilize the float against undesired oscillation.

Further features and advantages of the invention will be apparent from the detailed description hereinbelow set forth, together with the accompanying drawings.

Brief description of the drawings

FIG. 1 is a vertical cross-sectional view of a meter embodying the invention in a particular form;

FIG. 2 is an enlarged vertical detail view, partly in section, of the stabilizing means of the meter of FIG. 1;

FIG. 3 is a top view of the stabilizing means, taken along the line 3—3 of FIG. 2;

FIG. 4 is a fragmentary view showing the arrangement of meter float and stabilizing means in a modified embodiment of the invention;

FIG. 5 is an enlarged vertical detail view, partly in section, of a modified form of the stabilizing means of FIGS. 1–3;

FIG. 6 is a vertical cross-sectional view of a meter incorporating an alternative embodiment of the invention;

FIG. 7 is a top view of the stabilizing means of the embodiment of FIG. 6, taken along the line 7—7 of FIG. 6; and FIG. 8 is an enlarged vertical detailed view, partly in section, of a modified form of the stabilizing means of FIGS. 6–7.

Detailed description

Referring first to FIG. 1, the invention in its illustrated form is shown as incorporated in a variable restriction flowmeter 10 of the tapered tube type arranged for vertical fluid entry and exit. This meter structure includes a fixed tube 11 of metal or the like defining an axially vertical passage 12 for upward flow of fluid to be metered. The tube has a tapered portion 14 shaped to provide an elongated, downwardly-tapering portion 15 of the passage 12, this passage portion 15 being circular in cross-section throughout. Fluid enters the passage 12 through inlet 16 at the lower end of the tube and departs through outlet 17 at the upper end. Lower and upper flanges respectively designated 18 and 19 are secured to the ends of the tube for mounting the meter in a fluid conduit system.

A float 20 is positioned within the passage 12 for guided motion therein along a vertical rectilinear path coincident with the passage axis. The float includes a disc-shaped float head 21 with a diameter slightly smaller than the diameter of the passage 12 at a preselected lower level 22 in the tapered passage portion 15, and also has a cylindrical portion 23 extending upwardly from the float head along the passage axis. A pair of vertical guide rods or stems 25, 26, carried by the float, respectively extend above and below the body of the float along the passage axis through fixed guide spiders 27, 28 which are respectively mounted in the upper and lower ends of the passage 12. The spiders are adapted to permit vertical movement of the guide rods while preventing lateral displacement of the rods. Upper and lower limits of vertical travel of the float in the passage are determined by abutment of portions of the float structure with the guide spiders when the float is at the extremities of its path of travel.

In the illustrated arrangement, the float 20 is adapted to move vertically through the tapered portion 15 of passage 12, carrying the guide rods with it, and in effect riding on the stream of fluid flowing through the meter passage. The float head 21 and the tapered wall 14 of tubes 11 cooperate to define an annular space 30 for flow of fluid between the tube and float in the passage; since the passage portion 15 tapers downwardly, it will be appreciated that as the float head 21 is elevated above the aforementioned lower level 22 (which represents the lower limit of float travel in the passage), the cross-sectional area of this annular space becomes progressively larger. As hereinafter more fully explained, when fluid is flowing through the passage 12, the float assumes a position in the passage which at any instant is uniquely determined by the rate of fluid flow through the passage at such instant, so that float position provides an indication or measurement of this flow rate.

With the meter structure shown there may be employed means for providing, at a locality external to the meter tube 11, a continuous indication of the float position as a measure of flow rate through the passage. An exemplary form of such indicating means is illustrated in somewhat simplified form in FIG. 1 as including a first elongated and end-polarized cylindrical permanent magnet 32 mounted in the cylindrical portion 23 of the float coaxially therewith so as to be carried by the float, and a second elongated and end-polarized permanent magnet 33 disposed outside but adjacent the tube 11. The second magnet 33 is pivotally mounted, for rotation about its centerpoint in a vertical plane containing its long axis, at a level corresponding to the midpoint of the vertical path of travel of the first magnet 32 with float 20 in the tube 11; the disposition of this second magnet is such that as the first magnet undergoes vertical displacement in the tube, forces of magnetic attraction acting between the two magnets across the intervening space cause the second magnet to rotate, following the first magnet. An indicator needle 34, connected to the second magnet for rotation therewith, is associated with an appropriately calibrated dial 35 to enable the angular position of magnet 33 (which is determined by the vertical position of magnet 32) to be read in units of flow rate of fluid through the meter. The external portions of the indicator mechanism are conveniently mounted and enclosed in an indicator housing 36 secured to the meter tube 11 in suitable manner. It will be appreciated that the indicator means shown forms no part of the present invention and accordingly need not be described in detail.

The stabilizing means of the invention, in the embodiment illustrated in FIGS. 1–3, includes the upper guide rod or stem 25 of the float, the upper guide spider 27, and further elements as hereinafter described. In accordance with the invention, stem 25 is provided with a helically threaded outer surface 37; for example, the stem may be formed from a metal bar of square cross section which is twisted about its long axis so that the longitudinal edges of the bar form a regular helical thread. Spider 27 has a central aperture 38, through which the stem 25 extends, sufficiently large to enable free vertical movement of the stem therethrough with clearance, and has three legs 39 extending downwardly and inwardly toward the aperture 38. The spider and stem are so disposed and arranged, relative to each other, that as the stem 25 moves along its vertical path with float 20, at all positions of the float between the upper and lower limits of float travel, the stem extends from the float entirely through and beyond the guide aperture 38.

Further in accordance with the invention, and as more particularly shown in FIGS. 2 and 3, a nut or collar 40 is loosely threaded on stem 25 above the guide spider 27. By the term "loosely threaded," as herein used, it is to be understood that the collar does not pass freely over the stem but must rotate relative to the threaded stem surface in order to advance along the stem (in the same manner as a conventional nut advances along a bolt on which it is threaded), yet the engagement between stem and collar is sufficiently loose so that the collar, if not restrained, rotates freely and thereby advances downwardly relative to the stem under the force of gravity alone acting on the collar. Stated more particularly, the collar has an aperture 42, through which the stem 25 extends, dimensioned to provide close clearance between the stem and collar; the edge of this aperture and the threaded stem surface are mutually shaped and adapted to permit relative vertical movement of the collar and stem 25 when there is a net difference in the vertical forces acting on them but to require relative rotation of the stem and collar for such vertical movement. By way of specific example, when the stem 25 is a length of twisted square bar as described above, the collar aperture 42 may be a square hole dimensioned to provide the aforementioned loosely threaded engagement with the stem.

The collar 40 and the guide spider 27 are further mutually arranged and adapted so that the collar seats on spider 27, which thus acts as a stop limiting the downward travel of the collar relative to the meter tube 11. Specifically, the outer dimension of the collar is such, relative to the dimensions of spider 16, that the lower outer edge of the collar bears against the downwardly and inwardly sloping legs 39 of the spider, i.e. the collar at its lowermost position is wedged against the spider legs.

The upper extremity of stem 25 is closely threaded in conventional manner, as indicated at 44, to hold one or more lock nuts 45, which (when fixed on the threaded stem extremity as shown) serve to prevent the collar 40 from slipping over the upper end of the stem. In the meter shown in FIG. 1, these lock nuts also establish the lower limit of float travel; that is to say, downward movement of the float is arrested when the float descends to a level at which the locknuts bear against the collar 40 seating on the spider 27, this being the position shown in FIG. 1. The upper limit of float travel, in the FIG. 1 meter, is reached when the upper end of the cylindrical float portion 23 bears against the lower surface of guide spider 27.

In assembling the illustrated meter, after the spiders and float are installed in place in the meter tube with the upper stem 25 projecting through spider 27, the collar is slipped into position over the upper end of stem 25 and the locknut or locknuts 45 are secured in place on the closely threaded stem extremity 44. The meter may then be connected in upright position in a fluid conduit system, for measurement of the flow rate of fluid through the system, by means of flanges 18 and 19, the fluid flow being directed upwardly through the meter tube.

In the operation of the meter, when fluid flows through the inlet 16, the upward forces exerted on the float 20 by the advancing fluid stream elevate the float in the tube 11. As the float rises through the tapered tube owing to the pressure difference between the upstream and downstream sides of the float head (a function of the fluid flow rate), the annular space 30 for passage of fluid between the float head and tube progressively increases in area, with concomitant reduction in the upward forces acting on the float, until a point is reached at which these upward forces equal the downward forces on the float, this being the point at which the area of the annular space accommodates the fluid flow due to the aforementioned pressure difference. The float comes to rest at this equilibrium point (which is determined by the fluid flow rate) and remains there until an increase in flow rate causes the float to rise, or a decrease in flow rate causes the float to descend, to a new equilibrium point which again is determined by the new (higher or lower) flow rate. Thus at all times the position of the float indicates the rate of flow fluid then passing through the tube, and is read as such by means of the indicator mechanism. These general principles of operation of a meter of the variable restriction type are well known in the art and accordingly need not be explained in detail.

Upon upward motion of the float and guide stem 25, the loosely threaded engagement of the latter stem with collar 40 tends to lift the collar (as shown in FIG. 2) up and away from the guide spider 27 on which the collar rests when the float is stationary. As stated, the collar is of such shape and clearance as to rotate freely on the stem when not restrained. The downward force of gravity acting on the collar accordingly causes the collar to undergo such free rotation relative to the stem, in a direction for downward movement of the collar, as the stem is driven upwardly through it. In other words, while the upward movement of the stem tends to lift the collar clear of the guide spider, enabling it to rotate freely as described, the free rotation of the collar under the force of gravity tends to move the collar back downwardly onto the guide spider, with the result that upon cessation of upward movement of the float the collar rests on the spider.

When the float moves downwardly, on the other hand, the loosely threaded engagement of the stem 25 with the collar imparts a downward force on the collar that causes the collar to bear against the guide spider legs 39, being in effect wedged against the downwardly tapering legs. Friction between the collar and spider restrains the collar against rotation, and therefore the float and stem 25 must rotate in order to continue their descent; the wedging contact between the collar and spider legs is particularly effective to provide such frictional restraint holding the collar against rotation. Again, the shape and clearance of the collar are such that the downward forces acting on the float cause the float to rotate freely, in a direction for downward movement of the float, the motion of the float being similar to that of a bolt threading out of a nut.

Thus, if the float tends to undergo vertical oscillation in operation, the collar 40 is lifted sufficiently on each upward movement of the oscillating cycle to permit free rotation of the collar without any rotation of the float. On each downward movement of the float, the collar seats against the guide spider before the float reaches its minimum elevation; and with the collar thereby restrained by friction against rotation, the float must rotate to continue its downward motion. Each time the collar seats against the guide spider (that is, on each descent of the oscillating float), energy is absorbed, opposing the tendency of the float to oscillate. Also, because the float is forced to rotate during each descent and does not rotate during its upward stroke, the effective mass of the float during downward motion is different from that during upward motion, which further interferes with the natural frequency of oscillation. Frictional forces exerted on the float during downward motion contribute additional damping action.

In this way, it is found that vertical float oscillation is very effectively prevented, even in the case of comparatively high-mass floats operating with compressible fluids of low density. The stabilizing arrangement providing this effective damping action is simple, economical, and capable of protracted use with no special maintenance requirements. As illustrated in FIG. 1, the arrangement of the present invention may very conveniently be employed in a vertical fluid entry and exit meter configuration, and it affords completely dry operation since it involves no use of dashpots or damping liquids.

By way of further and more particular illustration of the invention, as a specific example of the present damping arrangement incorporated in a meter of the type illustrated in FIG. 1, with a float of approximately ½-inch float head diameter, it was found that a stem formed by twisting ⅛-inch square bar to provide a helical screw thread surface of approximately ⅞-inch pitch and a collar having a square hole with approximately 0.015 inch clearance (between collar and stem) dampened float oscillation sufficiently to enable stable meter operation over a 10-to-1 flow range metering air at 10 p.s.i.g. Without the stabilizing arrangement, an operating pressure of at least 400 p.s.i.g. would have been required to attain meter stability.

It will be appreciated that in the embodiment of the invention described above, the upper guide spider and upper guide rod of the meter float are used as the collar stop member and stem, respectively, of the present stabilizing arrangement. Thus, in this embodiment, these elements serve a double purpose, cooperating in the prevention of vertical oscillation as well as performing their usual function of restraining the float against lateral displacement. Different arrangements, wherein the stem and stop member do not constitute part of the float guide system, may be employed, as likewise alternative forms of helical stem thread and collar (for example, a cylindrical threaded stem and tapped nut or collar of aprropriate pitch and clearance to provide the desired nonlocking, loosely threaded engagement).

One modified embodiment of the invention, in which the stem of the stabilizing device constitutes the lower guide rod of the float in a meter of the type shown in FIG. 1, is illustrated in FIG. 4. In this instance, the lower stem 26 may be a length of square metal bar twisted to provide a helically threaded surface 48. The collar 40 is loosely threaded on stem 26 between the lower end of float 20 and the upper surface of the lower guide spider 28. With the float and stem lengths and the disposition of the upper and lower spiders so chosen that the stem 26 extends entirely through spider 28 when the float is at the upper limit of its travel (as established by abutment of the float body against the upper guide spider), it is unnecessary to provide locknuts at the lower end of the stem, as the spider 28 effectively prevents the collar 40 from slipping off the stem.

For assured effective restraint of the collar 40 against rotation during downward movement of the float 20, in this embodiment a grip member 50 may be secured as by welding to the upper surface of spider 28. In the form shown, the grip member has a central aperture 51 through which stem 48 passes with clearance, and a pair of upwardly flaring prongs or arms 52 disposed on opposite sides of the latter aperture. The relative dimensions of this grip member and collar 40 are such that when the collar is at its lowermost position relative to spider 28, the lower outer edge of the collar engages the downwardly sloping surfaces of prongs 52, the collar being thereby in effect wedged against these prongs in like manner as the collar in the embodiment of FIGS. 1–3 is wedged against the legs of spider 27.

The operation of this arrangement is essentially the same as that of the embodiment shown in FIGS. 1–3, the relative dimensions and cooperation of the collar and threaded stem being the same as in that structure. Thus, when the float moves upwardly, collar 40 rotates freely on the stem, being lifted away from the surface of spider 28; but upon downward motion of the float, the collar is wedged against the grip member 52. The frictional engagement of the collar and the grip member arms very effectively restrains the collar against rotation so that the float must rotate. In this way, vertical oscillation of the float is effectively damped, as before.

In FIG. 5, there is shown a further modified embodiment of the stabilizing means of the invention, generally similar to that of FIGS. 1–3 in having a helically threaded upper float stem 25 with a collar 40 disposed thereon above the spider 27, but also including additional stop means for limiting upward displacement of the collar away from the latter spider. In this connection it may be explained that under conditions of high fluid flow rate through the meter, the collar may be supported by fluid drag acting thereon; i.e. when the collar is lifted away from the spider 27 by upward movement of the float, fluid drag may prevent the collar from moving downward relative to stem 25 and indeed the collar may rise with the stem to a considerable distance above its position of seating engagement with the spider legs 39. This tendency toward sustained elevation of the collar is particularly likely to occur if the collar should happen to rise into the relatively narrow outlet opening 17 or into a narrow conduit portion above the latter opening, where the fluid flow velocity is higher than in the enlarged meter passage 12. It is desirable to prevent the collar from being thus held substantially away from its seat in spider 27; specifically, for effective stabilizing action, the collar should be prevented from rising to the region of increased fluid velocity above the passage 12 and should be maintained in fairly close proximity to its seat in spider 27, so that upon downward movement of the float the collar readily engages the spider and is restrained from rotation to provide the abovedescribed stabilizing effect.

To this end, as stated, in the embodiment of FIG. 5 a stop member is provided, spaced above the locality at which collar 40 seats in spider 27, for engaging the collar when the latter is displaced upwardly to limit such upward displacement, the collar being disposed between this stop member and the lower portion of the spider. The stop member may be any suitable structure providing a square and moderately low-friction engagement with the upper surface of the collar, as exists for example between many surfaces of common metallic materials having common surface finishes, so that the collar is substantially free to rotate while in engagement with this upper stop.

In the form shown in FIG. 5, the upper stop member is a washer 54, secured to the upper portions of the legs of spider 27 by welding as indicated at 55, and having a central aperture 56 through which stem 25 passes with clearance. The operation of this stabilizing means is essentially similar to that of the embodiments described above; i.e. during upward movement of the float, the collar 40 rotates substantially freely, moving downward relative to stem 25, so that float motion is substantially unrestricted during its upward travel, while during downward float motion the collar is restrained against rotation by wedging engagement with spider 27 so that the float must rotate to descend. The stop member 54 prevents the collar from rising above the spider. Should high flow velocities occur in the region of the spider such that there is a tendency for the collar to be lifted from its seat in the spider during conditions of oscillatory float motion, the collar will alternately engage the stop member 54 and the legs 39 of spider 27 owing to the alternating net difference in vertical force between the collar and stem 25 caused primarily by friction between the collar and the stem. Since the collar 40 is free to rotate while in engagement with stop member 54, and is restrained against rotation by engagement with the legs of spider 27, effective damping of float oscillation is attained.

An additional embodiment of the invention is illustrated in FIGS. 6 and 7, as incorporated in the tapered-tube flow meter 10 shown in FIG. 1. It will be understood that, except as hereinafter explained, the elements of the meter 10 shown in FIG. 6 may be identical in structure, arrangement and function to the correspondingly numbered elements in the meter of FIG. 1, already described above.

In the device of FIGS. 6 and 7, as in that of FIG. 1, the upper guide stem 25 (carried by and extending vertically upward from the float 20) is provided with a helically threaded outer surface 37, for example being formed, as before, from a metal bar of square cross section which is twisted about its long axis so that the longitudinal edges of the bar form a regular helical thread. The stem 25 extends through an upper guide spider 60 which is fixedly mounted in the meter passage above the float, in a position corresponding to that of spider 27 in FIG. 1. Again as in the structure of FIG. 1, the upper extremity 44 of stem 25 (above the spider 60) is closely threaded in conventional manner to hold one or more lock nuts 45; these lock nuts, when fixed on the threaded stem extremity 44 as shown, serve as a stop limiting downward movement of the float by engagement with the spider 60.

In the embodiment of FIGS. 6 and 7, however, the nut or collar 40 of the FIG. 1 structure is omitted, and the apertured member which is loosely threaded on stem 25 to provide the desired oscillation-damping action constitutes the central portion 60a of the upper guide spider 60. The spider portion 60a is at all times held fixed in relation to the meter tube 11 by the legs 60b of the spider, which are formed integrally with portion 60a and are rigidly mounted to the meter tube structure at the upper end thereof. Specifically, the stem 25 extends through a central aperture 61 in the spider central portion 60a; the aperture 61 is shaped and dimensioned (in the same manner as the aperture 42 of the collar 40 in FIG. 1) so as to be in loosely threaded engagement with the helical thread of the stem outer surface 37. For example, when the stem 25 is a length of twisted square bar as described, the spider aperture 61 may be a square hole (as shown in FIG. 7) dimensioned to provide the desired loosely threaded engagement with the stem.

By virtue of this closely threaded engagement, vertical displacement of the stem 25 relative to the spider portion 60a requires threading motion of the stem (that is, rotation of the stem about its vertical axis) relative to the spider portion. Therefore—since the spider portion 60a is fixedly supported in the meter structure at all times by the spider legs 60b—upward as well as downward movement of the float 20 in the meter passage is necessarily accompanied by rotation of the float and stem relative to the meter tube 11; upward travel of the float causes rotation of the float and stem in one direction, while downward travel of the float is accompanied by float and stem rotation in reverse direction. In this respect, the operation of the meter shown in FIGS. 6–7 differs from that of the FIG. 1 meter, wherein rotation of the float and stem occurs only during downward float movement, when the movable collar 40 is held by frictional engagement with the spider 27.

Stabilizing action (that is, prevention of undesired float oscillation) is produced in the structure of FIGS. 6–7 by frictional damping owing to the loosely threaded engagement of the stem 25 with the fixed spider 60 during both upward and downward motion and also by the increase in effective float mass during such motion (as compared to the effective mass of the float when static) which results from the rotation imposed on the float as it moves.

As shown in FIG. 8, the lower guide stem 26 of the float rather than the upper guide stem may be provided with a helically threaded surface 48 (corresponding to the surface 37 of stem 25 in FIGS. 6–7), and in such case the lower guide spider 28 may be replaced with a guide spider 63 having in its central portion 63a an aperture 64 (corresponding to the aperture 61 of spider 60 in FIGS. 6–7) shaped for loosely threaded engagement with the surface 48 of stem 26. The spider portion 63a is held fixed in position by the spider legs 63b; hence, as in the embodiment of FIGS. 6 and 7, vertical float movement in either upward or downward direction is necessarily accompanied by threading movement involving float rotation, with the result that undesired vertical float oscillation is prevented in the same manner as in the last-mentioned embodiment.

It is found that embodiments of the invention which utilize a movable apertured collar (effecting float rotation only during downward float movement) as shown in FIGS. 1–5 afford superior stabilizing action in relatively small flow meters, while in larger meters it is preferred to use embodiments which employ a fixed apertured member (producing float rotation during both upward and downward float movement) as shown in FIGS. 6–8. By way of example, stated with reference to flow meters of the tapered tube type described above for measuring flow of gas such as air, devices of the invention including a movable collar are found to provide effective float stabilization in meters having a float diameter of about 1 inch or less; devices of the invention including a fixed apertured member provide satisfactory float-stabilizing operation in meters of such type having a float diameter of about 0.7 inch or larger, at gas pressures down to 0 p.s.i.g. It is presently believed that the reason for the reduced effectiveness of the movable collar devices in meters having a float diameter larger than about 1 inch is that such movable collar arrangements do not provide sufficient dynamic friction force, at the lower oscillating frequencies typically encountered in operation of these larger meters, to accomplish the desired damping action. The greater dynamic friction provided by the devices employing a fixed apertured member renders them especially advantageous for use in meters having a float diameter ranging upwardly from about 1 inch.

It is to be understood that the invention is not limited to the features and embodiments hereinabove set forth, but may be carried out in other ways without departure from its spirit.

We claim:

1. In a variable restriction fluid flowmeter, in combination,
   (a) structure including a stationary tube member defining a vertically extending passage for fluid flow;
   (b) a movable float member disposed in the passage for vertical movement therein, said tube and float members being mutually adapted to define in said passage a space for fluid flow between said members that varies in cross-sectional area with the vertical position of said float in said passage, said float member moving in response to the pressure difference between the upstream and downstream sides of the float member to a vertical position wherein said cross-sectional area accommodates the flow due to that pressure difference, whereby the vertical position of the float member is an indication of the rate of flow;
   (c) a stem having a helically threaded surface, secured to said float member and extending vertically from one end thereof for movement with said float member along a vertical path;
   (d) an apertured member loosely threaded on said stem, said stem and apertured member being mutually dimensioned and adapted to permit vertical displacement of said stem relative to said apertured member but to require rotation of said stem relative to said apertured member incident to said relative vertical displacement thereof; and
   (e) means for holding said apertured member to prevent rotation and vertical displacement thereof relative to said structure during vertical displacement of said float member in at least one direction, so that displacement of said float member in said one direction is accompanied by rotation thereof.

2. A meter as defined in claim 1, wherein said stem extends downwardly from said float member and said apertured member is supported by said holding means beneath said float member in said passage.

3. A meter as defined in claim 1, wherein said stem extends upwardly from said float member and said apertured member is supported by said holding means above said float member in said passage.

4. A meter as defined in claim 1, wherein said stem is an elongated bar of square cross section twisted to constitute the longitudinal edges of said bar as a helical thread, and wherein said apertured member has an aperture of square cross section through which said stem extends, dimensioned to provide clearance between said apertured member and stem.

5. In a variable restriction fluid flowmeter, in combination,
   (a) structure including a stationary tube member defining a vertically extending passage for fluid flow, said passage having a downwardly tapered portion and said structure providing vertically aligned openings for entry and exit of fluid at the lower and upper ends of said passage respectively;
   (b) a movable float member disposed in the passage for vertical movement through said tapered portion thereof, said float member including a float head of vertical extent substantially less than the vertical extent of said tapered passage portion, said float head having a maximum diameter slightly smaller than the diameter of said tapered passage portion at a pre-selected lower level therein, to cooperate with said tube member to define in said tapered passage portion an annular space for fluid flow between said float head and the tube member that varies in cross-sectional area with the vertical position of said float in said tapered passage portion, said float member moving in response to the pressure difference between the upstream and downstream sides of the float member to a vertical position wherein said cross-sectional area accommodates the flow due to that pressure difference, whereby the vertical position of the float member is an indication of the rate of flow;
   (c) a stem having a helically threaded surface, secured to said float member and extending vertically from one end thereof through said passage coaxially therewith for movement with said float member along a vertical path;
   (d) an apertured member loosely threaded on said stem, said stem and apertured member being mutually dimensioned and adapted to permit vertical displacement of said stem relative to said apertured member but to require rotation of said stem relative to said apertured member incident to said relative vertical displacement thereof; and
   (e) means for holding said apertured member to prevent rotation and vertical displacement thereof relative to said structure during vertical displacement of said float member in at least one direction, so that displacement of said float member in said one direction is accompanied by rotation thereof.

6. In a variable restriction fluid flowmeter, in combination,
   (a) structure including a stationary tube member defining a vertically extending passage for fluid flow;
   (b) a movable float member disposed in the passage for vertical movement therein, said tube and float members being mutually adapted to define in said passage a space for fluid flow between said members that varies in cross-sectional area with the vertical position of said float in said passage, said float member moving in response to the pressure difference between the upstream and downstream sides of the float member to a vertical position wherein said cross-sectional area accommodates the flow due to that pressure difference, whereby the vertical position of the float member is an indication of the rate of flow;
   (c) a stem having a helically threaded surface, secured to said float member and extending vertically from one end thereof for movement with said float member along a vertical path;
   (d) an apertured member loosely threaded on said stem, said stem and apertured member being mutually dimensioned and adapted to permit vertical displacement of said stem relative to said apertured member but to require rotation of said stem relative to said apertured member incident to said relative vertical displacement thereof; and
   (e) means fixedly secured to said structure and said apertured member for holding said apertured member fixedly in relation to said structure during upward and downward vertical displacement of said float member so that both upward and downward vertical displacement of said float member are accompanied by rotation of said float member.

7. A meter as defined in claim 6, wherein said stem extends downwardly from said float member and said apertured member is mounted by said holding means beneath said float member in said passage.

8. A meter as defined in claim 6, wherein said stem extends upwardly from said float member and said apertured member is mounted by said holding means above said float member in said passage.

9. In a variable restriction fluid flowmeter, in combination,
(a) structure including a stationary tube member defining a vertically extending passage for fluid flow, said passage having a downwardly tapered portion and said structure providing vertically aligned openings for entry and exit of fluid at the lower and upper ends of said passage respectively;
(b) a movable float member disposed in the passage for vertical movement through said tapered portion thereof, said float member including a float head of vertical extent substantially less than the vertical extent of said tapered passage portion, said float head having a maximum diameter slightly smaller than the diameter of said tapered passage portion at a preselected lower level therein, to cooperate with said tube member to define in said tapered passage portion an annular space for fluid flow between said float head and tube member that varies in cross-sectional area with the vertical position of said float in said tapered passage portion, said float member moving in response to the pressure difference between the upstream and downstream sides of the float member to a vertical position wherein said cross-sectional area accommodates the flow due to that pressure difference, whereby the vertical position of the float member is an indication of the rate of flow;
(c) a stem having a helically threaded surface, secured to said float member and extending vertically from one end thereof through said passage coaxially therewith for movement with said float member, along a vertical path;
(d) a guide member loosely threaded on said stem and fixedly mounted in said passage, said stem and guide member being mutually dimensioned and adapted to permit vertical displacement of said stem relative to said guide member but to require rotation of said stem relative to said guide member incident to said relative vertical displacement thereof, said guide member comprising a central portion having an aperture through which said stem extends, and a supporting portion formed integrally with said central portion and fixedly secured to said structure.

10. A meter as defined in claim 9, wherein said stem is an elongated bar of square cross section twisted to constitute the longitudinal edges of said bar as a helical thread and wherein said aperture of said guide member is of square cross section and is dimensioned to provide clearance between said guide member and said stem.

11. In a variable restriction fluid flowmeter, in combination,
(a) structure including a stationary tube member defining a vertically extending passage for fluid flow;
(b) a movable float member disposed in the passage for vertical movement therein, said tube and float members being mutually adapted to define in said passage a space for fluid flow between said members that varies in cross-sectional area with the vertical position of said float in said passage, said float member moving in response to the pressure difference between the upstream and downstream sides of the float member to a vertical position wherein said cross-sectional area accommodates the flow due to that pressure difference, whereby the vertical position of the float member is an indication of the rate of flow;
(c) a stem having a helically threaded surface, secured to said float member and extending vertically from one end thereof for movement with said float member along a vertical path;
(d) a stop member fixedly supported by said structure in the path of said stem and having a portion adjacent said stem, said stop member being positioned and adapted to permit free vertical movement of said stem in said path past said stop member; and
(e) a movable collar loosely threaded on said stem above said stop member, said threaded stem and said collar being mutually dimensioned and adapted to permit relative vertical displacement of said stem and collar in response to a net difference in vertical forces acting on them and to require relative rotation of said stem and collar for effecting said relative vertical displacement thereof, said stop member being further positioned and adapted to limit downward travel of said collar by engagement of said collar therewith, said collar being freely movable downward by rotation relative to said stem into engagement with said stop member upon upward displacement of said float member and being arrested by engagement with said stop member against rotation upon downward displacement of said float member, so that downward displacement of said float member is accompanied by rotation thereof.

12. A meter as defined in claim 11, wherein said stem extends downwardly from said float member and said stop member is positioned beneath said float member, and said collar being loosely threaded on said stem intermediate said float member and said stop member.

13. A meter as defined in claim 11, wherein said stem extends upwardly from said float member; said stop member is positioned above said float member; and further including means secured to and carried by the upper extremity of said stem for preventing said collar from passing over said upper extremity of said stem.

14. A meter as defined in claim 11, wherein said stem is an elongated bar of square cross section twisted to constitute the longitudinal edges of said bar as a helical thread, and wherein said collar has an aperture of square cross section, through which said stem extends, dimensioned to provide clearance between said collar and stem.

15. A meter as defined in claim 11, wherein said stop member has an aperture, through which said stem extends, dimensioned to permit free vertical movement of said stem with clearance between said stem and stop member and to prevent substantial lateral displacement of said stem.

16. In a variable restriction fluid flowmeter, in combination,
(a) structure including a stationary tube member defining a vertically extending passage for fluid flow, said passage having a downwardly tapered portion and said structure providing vertically aligned openings for entry and exit of fluid at the lower and upper ends of said passage respectively;
(b) a movable float member disposed in the passage for vertical movement through said tapered portion thereof, said float member including a float head of vertical extent substantially less than the vertical extent of said tapered passage portion, said float head having a maximum diameter slightly smaller than the diameter of said tapered passage portion at a preselected lower level therein, to cooperate with said tube member to define in said tapered passage portion an annular space for fluid flow between said float head and tube member that varies in cross-sectional area with the vertical position of said float in said tapered passage portion, said float member moving in response to the pressure difference between the upstream and downstream sides of the float member to a vertical position wherein said cross-sectional area accommodates the flow due to that pressure difference, whereby the vertical position of the float member is an indication of the rate of flow;
(c) an upper stem and a lower stem respectively secured to the upper and lower ends of said float member and extending vertically respectively above and below from said float member through said passage coaxially therewith, for movement with said float along coaxial vertical paths, one of said stems having a helically threaded surface;

(d) upper and lower guide members fixedly mounted in said passage above and below said tapered passage portion respectively and respectively associated with said upper and lower stems, said upper and lower guide members having apertures, coaxial with said passage, through which said upper and lower stems respectively extend, said apertures being dimensioned to permit free vertical movement of said stems with clearance between said stems and the guide members respectively associated therewith and to prevent substantial lateral displacement of said stems; and (e) a movable collar loosely threaded on said one stem above the guide member associated therewith, said threaded stem and said collar being mutually dimensioned and adapted to permit relative vertical displacement of said stem and collar in response to a net difference in vertical forces acting on them and to require relative rotation of said stem and collar for effecting said relative vertical displacement thereof, the guide member associated with said one stem being shaped and adapted to limit downward travel of said collar by engagement of said collar therewith, said collar being freely movable downward by rotation relative to said one stem into engagement with said guide member associated therewith upon upward displacement of said float member and being arrested by engagement with said last-mentioned guide member against rotation upon downward displacement of said float member, so that downward displacement of said float member is accompanied by rotation thereof.

17. A meter as defined in claim 16, wherein said one stem is the upper stem and is an elongated bar of square cross section twisted to constitute the longitudinal edges of said bar as a helical thread, and wherein said collar has an aperture of square cross section, through which said upper stem extends, dimensioned to provide clearance between said collar and upper stem; and further including means secured to and carried by the upper extremity of said upper stem for preventing said collar from passing over said upper extremity of said upper stem.

18. A meter as defined in claim 16, wherein said one stem is the lower stem and is an elongated bar of square cross section twisted to constitute the longitudinal edges of said bar as a helical thread, and wherein said collar has an aperture of square cross section, through which said lower stem extends, dimensioned to provide clearance between said collar and lower stem; said collar being loosely threaded on said lower stem intermediate the lower end of said float member and said lower guide member.

19. A meter as defined in claim 16, wherein said one stem is the upper stem, and wherein said upper guide member includes leg portions sloping downwardly and inwardly toward the aperture of said upper guide member, said collar being dimensioned to engage and wedge against said sloping leg portions of said upper guide member.

20. A meter as defined in claim 16, wherein said one stem is the upper stem, and further including stop means positioned to engage said collar at a predetermined distance above the lowermost position of said collar relative to said upper guide member for limiting upward displacement of said collar, said collar being disposed intermediate said upper guide member and said stop means.

21. A meter as defined in claim 16, wherein said one stem is the lower stem, and wherein said collar is disposed intermediate the lower end of said float member and said lower guide member, and further including collar-engaging means comprising a plurality of prongs secured to and sloping upwardly and outwardly from the upper surface of said lower guide member, said collar being dimensioned to engage and wedge against said sloping prongs.

References Cited

UNITED STATES PATENTS 2,400,097    5/1946    Brewer _____ 73—209

FOREIGN PATENTS 82,619    5/1916    Switzerland.
897,488    10/1953    Germany.

RICHARD C. QUEISSER, *Primary Examiner.*

EDWARD D. GILHOOLY, *Assistant Examiner.*

U.S. Cl. X.R.

73—320

UNITED STATES PATENT OFFICE
CERTIFICATE OF CORRECTION

Patent No. 3,425,279                                                    February 4, 1969

William Collins Conkling et al.

It is certified that error appears in the above identified patent and that said Letters Patent are hereby corrected as shown below:

Column 1, line 63, "real" should read -- read --. Column 2, line 12, "large" should read -- larger --. Column 5, line 3, "tubes" should read -- tube --; line 15, before "float" insert -- the --; line 71, before "understood" insert -- be --. Column 6, line 67, after "flow" insert -- of --. Column 8, line 43, after "legs" insert -- 39 --. Column 10, line 16, "closely" should read -- loosely --. Column 12, line 8, before "tube", cancel "the".

Signed and sealed this 31st day of March 1970.

(SEAL)
Attest:

Edward M. Fletcher, Jr.                                  WILLIAM E. SCHUYLER, JR.
Attesting Officer                                                Commissioner of Patents